United States Patent
Nagai

(10) Patent No.: US 7,688,182 B2
(45) Date of Patent: Mar. 30, 2010

(54) RFID SYSTEM AND RFID CHIP EQUIPPED WITH SENSOR FUNCTION

(75) Inventor: Eiichi Nagai, Kawasaki (JP)

(73) Assignee: Fujitsu Microelectronics Limited

( * ) Notice: Subject to any disclaimer, the term of this patent is extended or adjusted under 35 U.S.C. 154(b) by 809 days.

(21) Appl. No.: 11/360,601

(22) Filed: Feb. 24, 2006

(65) Prior Publication Data

US 2007/0096880 A1 May 3, 2007

(30) Foreign Application Priority Data

Oct. 31, 2005 (JP) .............................. 2005-316806

(51) Int. Cl.
- H04Q 5/22 (2006.01)
- B60C 23/02 (2006.01)
- G01S 13/08 (2006.01)

(52) U.S. Cl. ...................... 340/10.41; 73/146.5; 342/51

(58) Field of Classification Search ............... 340/10.34
See application file for complete search history.

(56) References Cited

U.S. PATENT DOCUMENTS

| | | | |
|---|---|---|---|
| 5,483,827 A * | 1/1996 | Kulka et al. ................ | 73/146.5 |
| 5,606,323 A * | 2/1997 | Heinrich et al. ........... | 340/10.34 |
| 5,731,754 A * | 3/1998 | Lee et al. .................... | 340/447 |
| 6,617,963 B1 * | 9/2003 | Watters et al. ........... | 340/10.41 |
| 6,720,866 B1 * | 4/2004 | Sorrells et al. ............. | 340/10.4 |
| 6,954,319 B2 * | 10/2005 | Yanagita et al. .............. | 360/46 |
| 6,970,690 B2 | 11/2005 | Yajima et al. | |
| 7,187,961 B2 | 3/2007 | Yamashita et al. | |
| 2005/0114326 A1 * | 5/2005 | Smith et al. .................... | 707/3 |

FOREIGN PATENT DOCUMENTS

| | | |
|---|---|---|
| JP | 08-055198 A | 2/1996 |
| JP | 2003-132316 A | 5/2003 |
| JP | 2004-024551 A | 1/2004 |
| JP | 2004-164050 | 6/2004 |

* cited by examiner

*Primary Examiner*—Daniel Wu
*Assistant Examiner*—Fekadeselassie Girma
(74) *Attorney, Agent, or Firm*—Arent Fox LLP.

(57) ABSTRACT

An integrated circuit chip includes a rectifier circuit configured to convert an alternating voltage supplied from an antenna into a direct-current voltage, a nonvolatile memory coupled to the rectifier circuit to operate by use of the direct-current voltage, a sensor circuit coupled to the rectifier circuit to operate by use of the direct-current voltage to collect measurement data, and a logic circuit configured to control the nonvolatile memory and the sensor circuit such that an access operation of the nonvolatile memory and a data collecting operation of the sensor circuit are not performed concurrently.

13 Claims, 5 Drawing Sheets

RFID SYSTEM AND RFID CHIP EQUIPPED WITH SENSOR FUNCTION

CROSS-REFERENCE TO RELATED APPLICATIONS

The present application is based upon and claims the benefit of priority from the prior Japanese Patent Application No. 2005-316806 filed on Oct. 31, 2005, with the Japanese Patent Office, the entire contents of which are incorporated herein by reference.

BACKGROUND OF THE INVENTION

1. Field of the Invention

The present invention generally relates to integrated circuit chips, and particularly relates to an integrated circuit chip for use as a RFID and to an RFID system.

2. Description of the Related Art

RFID (Radio Frequency Identification) is the system which reads/writes ID information via radio communication from/to an IC tag provided with an IC chip (integrated circuit chip) serving as a record medium for storing information. If barcodes or the like used in commercial goods management are replaced with RFIDs, for example, it is possible to eliminate the need to manually scan the barcodes or the like, thereby significantly improving the efficiency of commercial goods management.

The application of RFID in various fields in addition to its use for the purpose of identifying commercial goods is expected. In particular, RFID having a sensor function to measure the state of the environment around the IC tag can be utilized to keep a record of the manufacturing process (production process) of commercial goods and/or to keep a record of conditions during distribution.

For example, an RFID tag with a temperature sensor may be attached to perishable goods or the like to keep a record of temperature changes during distribution and/or processing of goods. This makes it possible to achieve diligent management and control of freshness and quality. With such arrangement, it is possible to properly cope with problems such as the lowering of quality of goods and to provide safe and high quality merchandise. The types of sensors that can be incorporated in RFID are not limited to a temperature sensor, but may include a three-axis sensor, a pressure sensor, an acceleration sensor, etc.

In order to implement such a sensor-equipped RFID tag, there is a need to implement a circuit having a sensor function and a measured data processing function in addition to the existing RFID function as a single chip. Incorporating the RFID function and the sensor function in a single chip requires highly sophisticated technology for combining analog circuitry and digital circuitry. There is also a need to cope with the problem of power consumption.

The performance of RFID is generally measured in terms of communication speed and communication distance. As for the communication speed, standards require a certain communication speed to be satisfied, leaving the communication distance as a factor to differentiate RFID chips from each other in terms of their performance. In order to increase communication distance, RFID chips are required to reduce power consumption inside the chip as much as possible.

IC tags are classified into an active type that operates by use of an embedded battery as a power source and a passive type that operates by use of a magnetic field or electric field supplied from an exterior as a power source without having an embedded battery. The passive type is not suited for long distance communication, but can be implemented at low price in small size owing to the absence of a battery.

A passive-type RFID chip receives a electromagnetic wave transmitted from a separate reader writer for conversion into an electric power, and stores the electric power in a capacitor provided inside the chip for use as the power supply for chip operation. The smaller the power consumption inside the chip, the smaller the electric power of the received electromagnetic wave can be, thereby achieving long distance communication. In the case of a RFID chip equipped with a sensor function, the sensor-function-purpose circuit in addition to the RFID-function-purpose circuit consumes an electric power. This makes it difficult to maintain a desired communication distance.

[Patent Document 1] Japanese Patent Application Publication No. 2004-164050

Accordingly, there is a need for an RFID IC chip and an RFID system that can allow a sensor function to operate without dropping a communication distance.

SUMMARY OF THE INVENTION

It is a general object of the present invention to provide an integrated circuit chip and RFID system that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an integrated circuit chip and RFID system particularly pointed out in the specification in such full, clear, concise, and exact terms as to enable a person having ordinary skill in the art to practice the invention.

To achieve these and other advantages in accordance with the purpose of the invention, the invention provides an integrated circuit chip, which includes a rectifier circuit configured to convert an alternating voltage supplied from an antenna into a direct-current voltage, a nonvolatile memory coupled to the rectifier circuit to operate by use of the direct-current voltage, a sensor circuit coupled to the rectifier circuit to operate by use of the direct-current voltage to collect measurement data, and a logic circuit configured to control the nonvolatile memory and the sensor circuit such that an access operation of the nonvolatile memory and a data collecting operation of the sensor circuit are not performed concurrently.

According to another aspect of the present invention, an RFID system includes a reader writer configured to transmit/receive a radio wave and an IC tag configured to communicate with the reader writer through the radio wave, wherein the IC tag includes an antenna, a rectifier circuit coupled to the antenna to convert an alternating voltage of the radio wave received by the antenna into a direct-current voltage, a nonvolatile memory coupled to the rectifier circuit to operate by use of the direct-current voltage, and a sensor circuit coupled to the rectifier circuit to operate by use of the direct-current voltage to collect measurement data, wherein control is performed such that an access operation of the nonvolatile memory and a data collecting operation of the sensor circuit are not performed concurrently.

According to at least one embodiment of the present invention, provision is made such that the data collecting operation of the sensor circuit and the access operation of the nonvolatile memory, which is generally the source of the largest power consumption, do not overlap temporally. With this provision, it is possible to prevent the power consumption per unit time by the sensor-equipped RFID chip from becoming greater than the power consumption per unit time by the nonvolatile memory. Accordingly, a sensor function can be incorporated into a RFID chip without shortening communication distance, compared with the case in which no sensor circuit is provided.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 1:
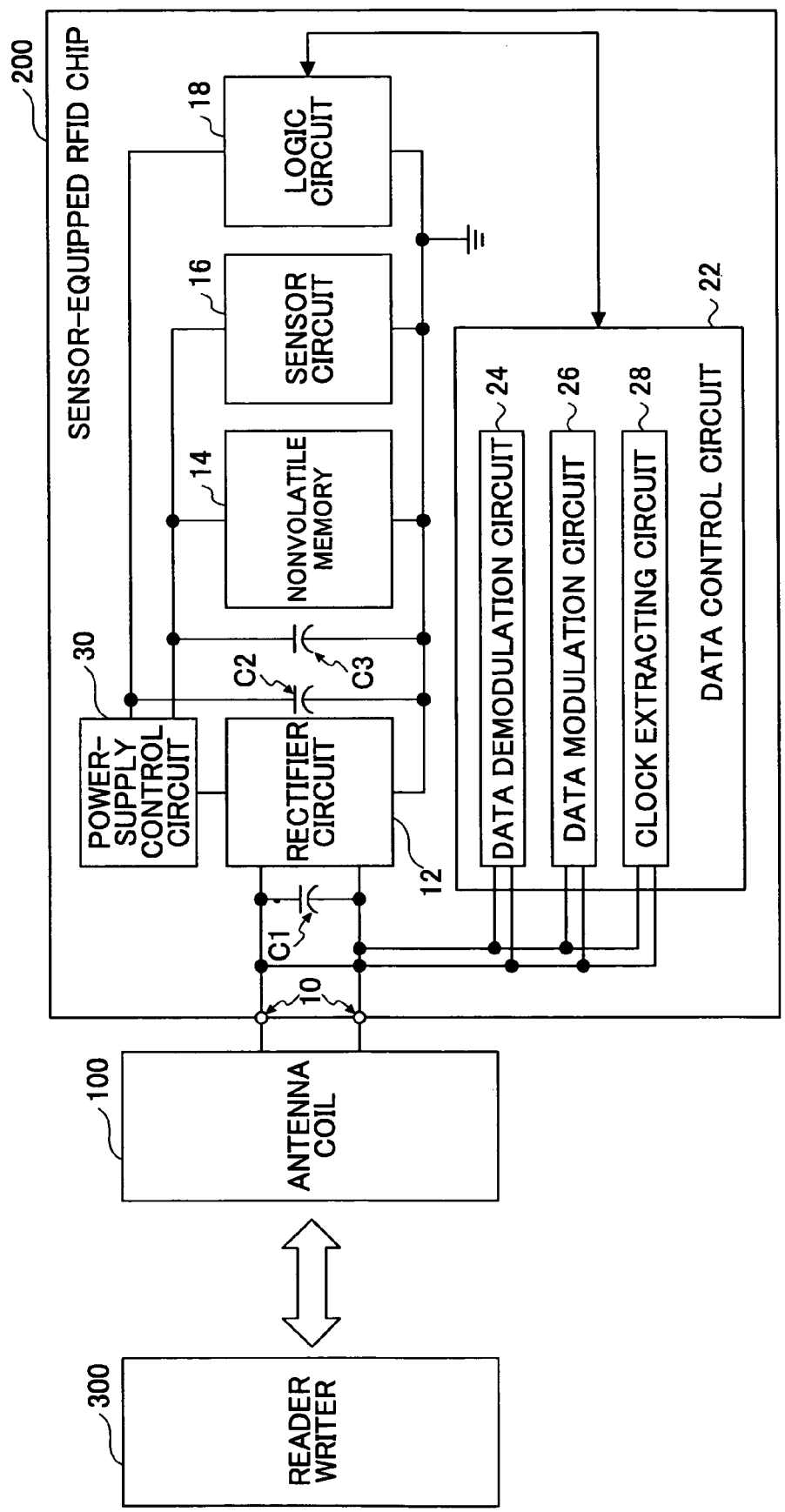
FIG. 1 is a block diagram showing an example of the configuration of a RFID system and a sensor-equipped RFID chip.

FIG. 1 is a block diagram showing an example of the configuration of a RFID system and a sensor-equipped RFID chip. The RFID system shown in FIG. 1 includes an antenna coil 100, a sensor-equipped RFID chip 200, and a reader writer 300. The antenna coil 100 is attached to the sensor-equipped RFID chip 200. The sensor-equipped RFID chip 200 receives a radio wave from the reader writer 300 via the antenna coil 100, and operates by use of the received electric power as a power supply. Further, the sensor-equipped RFID chip 200 performs radio communication with the reader writer 300 to exchange identification information, sensor information, etc.

The sensor-equipped RFID chip 200 includes antenna terminals 10 for connection with the antenna coil 100, a rectifier circuit 12, a nonvolatile memory 14, a sensor circuit 16, a logic circuit 18, a data control circuit 22, and a power-supply control circuit 30.

The antenna coil 100 is provided for the purpose of achieving the contactless reception of an electric power and signals via radio. Signals received by the antenna coil 100 are supplied to the rectifier circuit 12 and to the data control circuit 22. Namely, the radio waves received by the antenna coil 100 include not only a radio wave for supplying an electric power by use of the rectifier circuit 12 but also amplitude modulated signals, clock signals, etc., for the purpose of exchanging information. The electric power received by the antenna coil 100 has the voltage thereof boosted by the resonating effect created by an inductance L of the antenna and a resonator condenser C1 coupled in parallel. The boosted voltage is then supplied as an alternating voltage to the rectifier circuit 12.

The rectifier circuit 12 rectifies the alternating voltage supplied from the antenna coil 100 to generate a direct-current voltage. The direct-current voltage generated by the rectifier circuit 12 is supplied via the power-supply control circuit 30 to the nonvolatile memory 14, the sensor circuit 16, and the logic circuit 18 as a power-supply voltage. Smoothing capacitors C2 and C3 store electric charge in response to the direct-current voltage generated by the rectifier circuit 12 to smooth the rectified voltage, thereby serving to supply a stable power-supply voltage. The power-supply control circuit 30 controls the power supply for driving the nonvolatile memory 14, the sensor circuit 16, and the logic circuit 18. Although not illustrated, the data control circuit 22 also operates by use of the power-supply voltage generated by the rectifier circuit 12.

The logic circuit 18 performs the overall control of operations of the sensor-equipped RFID chip 200. The sensor circuit 16 may be a temperature sensor, for example, to measure the temperature of the environment around the sensor-equipped RFID chip 200. The nonvolatile memory 14 is a memory such as a flash memory, a ferroelectric memory, or the like that can retain data during the power-off period. The nonvolatile memory 14 stores the identification information of the sensor-equipped RFID chip 200, data measured by the sensor, etc.

The data control circuit 22 includes a data demodulation circuit 24, a data modulation circuit 26, and a clock extracting circuit 28. The data demodulation circuit 24 demodulates a modulated signal supplied from the reader writer 300 via the antenna coil 100 so as to restore a data signal. The data signal is then supplied to the logic circuit 18.

The data modulation circuit 26 modulates a data signal supplied from the logic circuit 18 to provided a modulated signal to the antenna coil 100. With this provision, data transmission to the reader writer 300 is performed. The clock extracting circuit 28 extracts the carrier wave of the signal supplied from the reader writer 300 via the antenna coil 100 as a clock signal. The extracted clock signal is supplied to the logic circuit 18.

Figure 2:
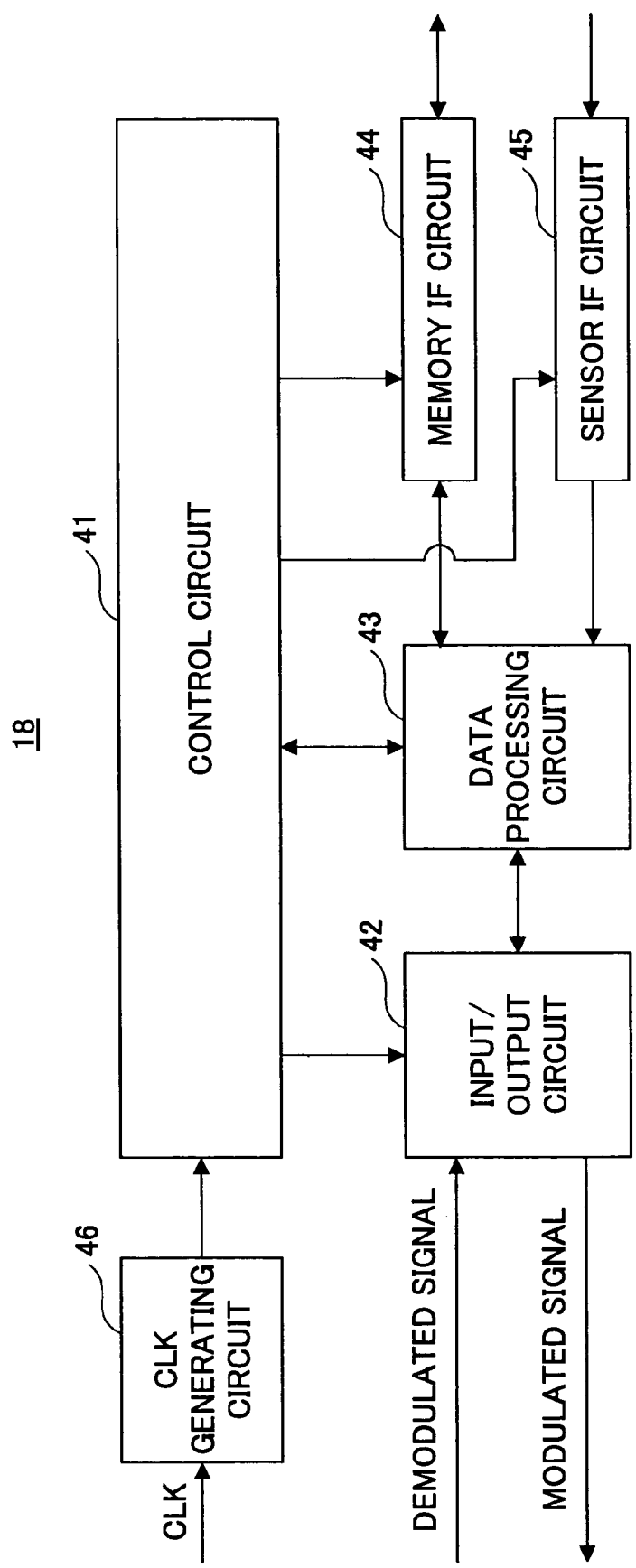
FIG. 2 is a block diagram showing an example of the configuration of a logic circuit.

FIG. 2 is a block diagram showing an example of the configuration of the logic circuit 18. The logic circuit 18 shown in FIG. 2 includes a control circuit 41, an input/output circuit 42, a data processing circuit 43, a memory IF circuit 44, a sensor IF circuit 45, and a CLK generating circuit 46. The control circuit 41 controls the operation of the input/output circuit 42, the data processing circuit 43, the memory IF circuit 44, and the sensor IF circuit 45.

The clock signal supplied from the clock extracting circuit 28 (see FIG. 1) is provided to the CLK generating circuit 46. The CLK generating circuit 46 may divide the frequency of the supplied clock signal, for example, to generate a clock signal with which individual circuit portions of the sensor-equipped RFID chip 200 synchronize to perform their operations.

The demodulated signal supplied from the data demodulation circuit 24 (see FIG. 1) is detected by the input/output circuit 42. The detected data is supplied to the data processing circuit 43. The data processing circuit 43 processes the supplied data to identify a command or the like indicated by the data. The data processing circuit 43 supplies to the control circuit 41 a signal indicative of the received command. In response, the control circuit 41 performs control operation in accordance with the received command.

The memory IF circuit 44 is an interface circuit for the purpose of reading/writing data with respect to the nonvolatile memory 14 (see FIG. 1). The sensor IF circuit 45 is also an interface circuit for the purpose of requesting data measurement to the sensor circuit 16 (see FIG. 1) and receiving measured data from the sensor circuit 16.

The data processing circuit 43 may be able to temporarily store, in internal registers, data supplied from the reader writer 300 via the input/output circuit 42, data received from the sensor circuit 16 via the sensor IF circuit 45, and data received from the nonvolatile memory 14 via the memory IF circuit 44. The control circuit 41 performs a control operation responsive to a command, thereby writing data stored in the registers of the data processing circuit 43 to the nonvolatile memory 14 via the memory IF circuit 44, or transmitting the data to the reader writer 300 via the input/output circuit 42 and the data modulation circuit 26.

Figure 3:
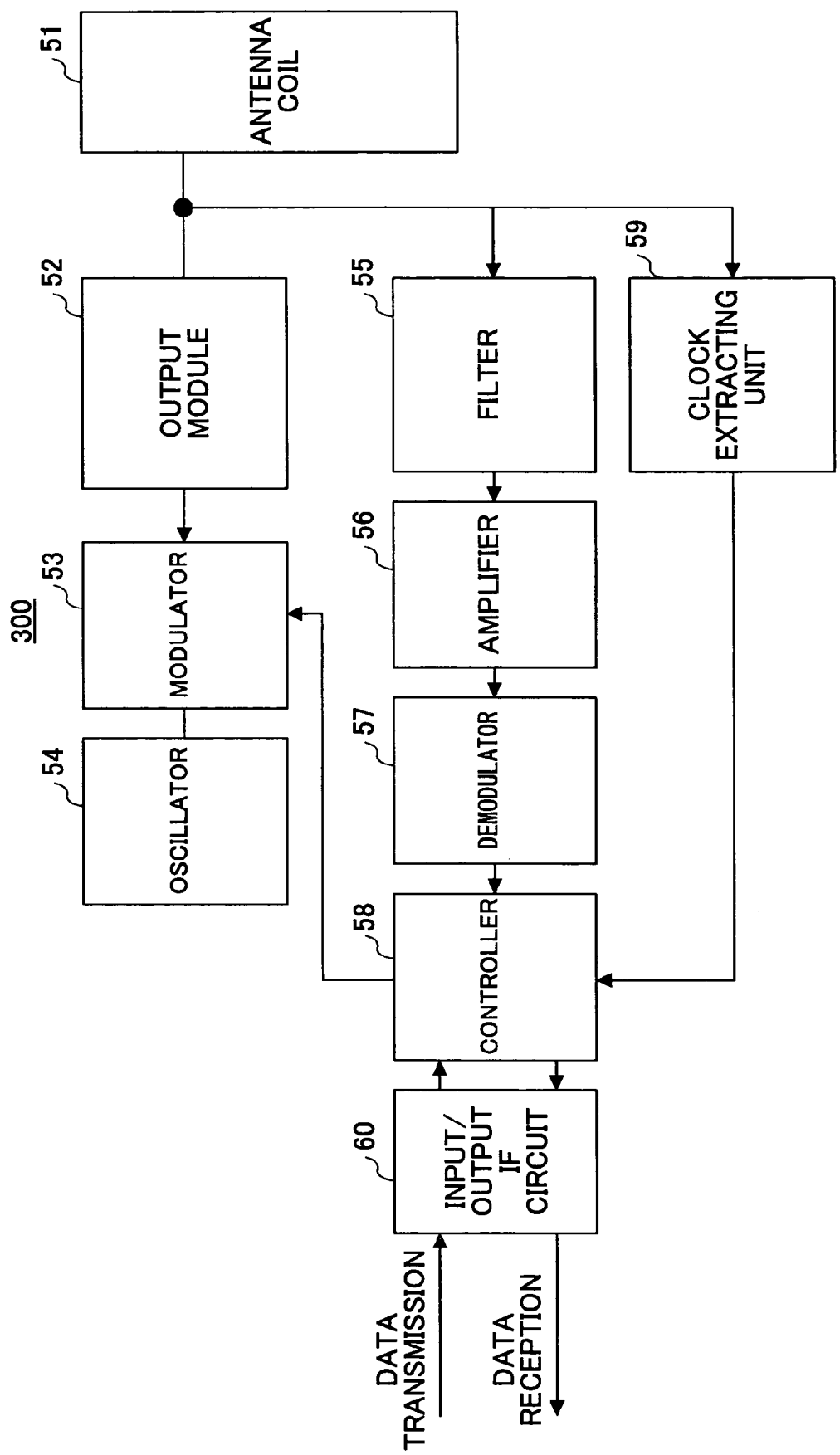
FIG. 3 is a block diagram showing an example of the configuration of a reader writer.

FIG. 3 is a block diagram showing an example of the configuration of the reader writer 300. The reader writer 300 shown in FIG. 3 includes an antenna coil 51, an output module 52, a modulator 53, an oscillator 54, a filter 55, an amplifier 56, a demodulator 57, a controller 58, a clock extracting unit 59, and an input/output IF circuit 60.

Upon receiving transmission data from an exterior (operator or host apparatus) via the input/output IF circuit 60, the controller 58 supplies the transmission data to the modulator 53. The modulator 53 modulates the transmission data to generate a modulated data signal for provision to the output module 52. The output module 52 transmits the modulated data signal from the antenna coil 51. This transmitted signal may be received by the sensor-equipped RFID chip 200 at the antenna coil 100.

A signal transmitted from the sensor-equipped RFID chip 200 is received by the reader writer 300 at the antenna coil 51. The received signal is filtered by the filter 55, amplified by the amplifier 56, and demodulated by the demodulator 57. The controller 58 supplies the demodulated signal to the exterior (operator or host apparatus) via the input/output IF circuit 60 as received data.

With this provision, data transfer is conducted in two ways by use of radio communication between the reader writer 300 and the sensor-equipped RFID chip 200. Data supplied from the sensor-equipped RFID chip 200 is transferred to the host apparatus side (e.g., to the computer side). Data such as a command to be supplied the sensor-equipped RFID chip 200 may be transferred from the host apparatus side (e.g., from the computer side). Alternatively, if the reader writer 300 is of a portable type, data supplied from the sensor-equipped RFID chip 200 may be presented to the operator on the display of the reader writer 300, and data such as a command to be supplied the sensor-equipped RFID chip 200 may be entered by the operator through the keypad of the reader writer 300.

In the present invention, the sensor-equipped RFID chip 200 and the reader writer 300 as exemplified in FIG. 1 through FIG. 3 are used, so that data is collected by use of the sensor circuit 16 of the sensor-equipped RFID chip 200, and the collected measurement data is stored in the nonvolatile memory 14. The measurement data supplied from the sensor circuit 16 or the measurement data stored in the nonvolatile memory 14 is read from the sensor-equipped RFID chip 200 by use of the reader writer 300.

In so doing, such control is performed that the sensing operation of the sensor circuit 16 and the access operation of the nonvolatile memory 14, which is generally the source of the largest power consumption, are not performed concurrently. Specifically, the data collecting operation by the sensor circuit 16 and the operation to write data to the nonvolatile memory 14 are controlled as to their operation timing such that they are not performed simultaneously. Such timing control may be achieved by the logic circuit 18, or may be achieved based on control by commands supplied from the reader writer 300. It should be noted that the operation to read data from the nonvolatile memory 14 may also be performed such as not to coincide with the data collecting operation by the sensor circuit 16.

The sensor of the sensor-equipped RFID chip 200 may be a temperature sensor. In such a case, the sensor-equipped RFID chip 200 may be attached to perishable food (vegetables, meat, milk, etc.) before the shipment of these goods. With such arrangement, the temperature of perishable goods is measured at appropriate timing during distribution following the shipment. The results of measurements are then successively stored in the memory of the sensor-equipped RFID chip 200. Temperature may be measured in the truck bed during transportation of perishable goods, in the storehouse where the perishable goods are stored, in the showcase at shops, etc. Specifically, the reader writer 300 transmits a temperature measurement request via radio at the places of temperature measurement as listed above, so that the sensor-equipped RFID chip 200 responds to this request by measuring the temperature.

Data of temperature measured by the sensor circuit 16 is written to the nonvolatile memory 14 via the logic circuit 18. The nonvolatile memory 14 has a unique ID (UID) area recorded at the semiconductor manufacturing factory, a unique area for storage of unique information (such as the origin, the name of the producer, the date of shipment, etc., in the case of food goods) of the goods to which the radio tag is attached, and a temperature management area for recording the temperature of food goods measured during distribution and circulation. The unique information of the goods is supplied from the reader writer 300 together with a write command, and is written to the nonvolatile memory 14. Data stored in the nonvolatile memory 14 can be read at desired timing by use of the reader writer 300.

The sensor circuit 16 does not have to be a temperature sensor, and may alternatively be another sensor such as a three-axis sensor, a pressure sensor, or an acceleration sensor. Specifically, any sensor that detects a certain physical parameter indicative of the environment around the RFID chip may properly be used in the present invention.

Figure 4:
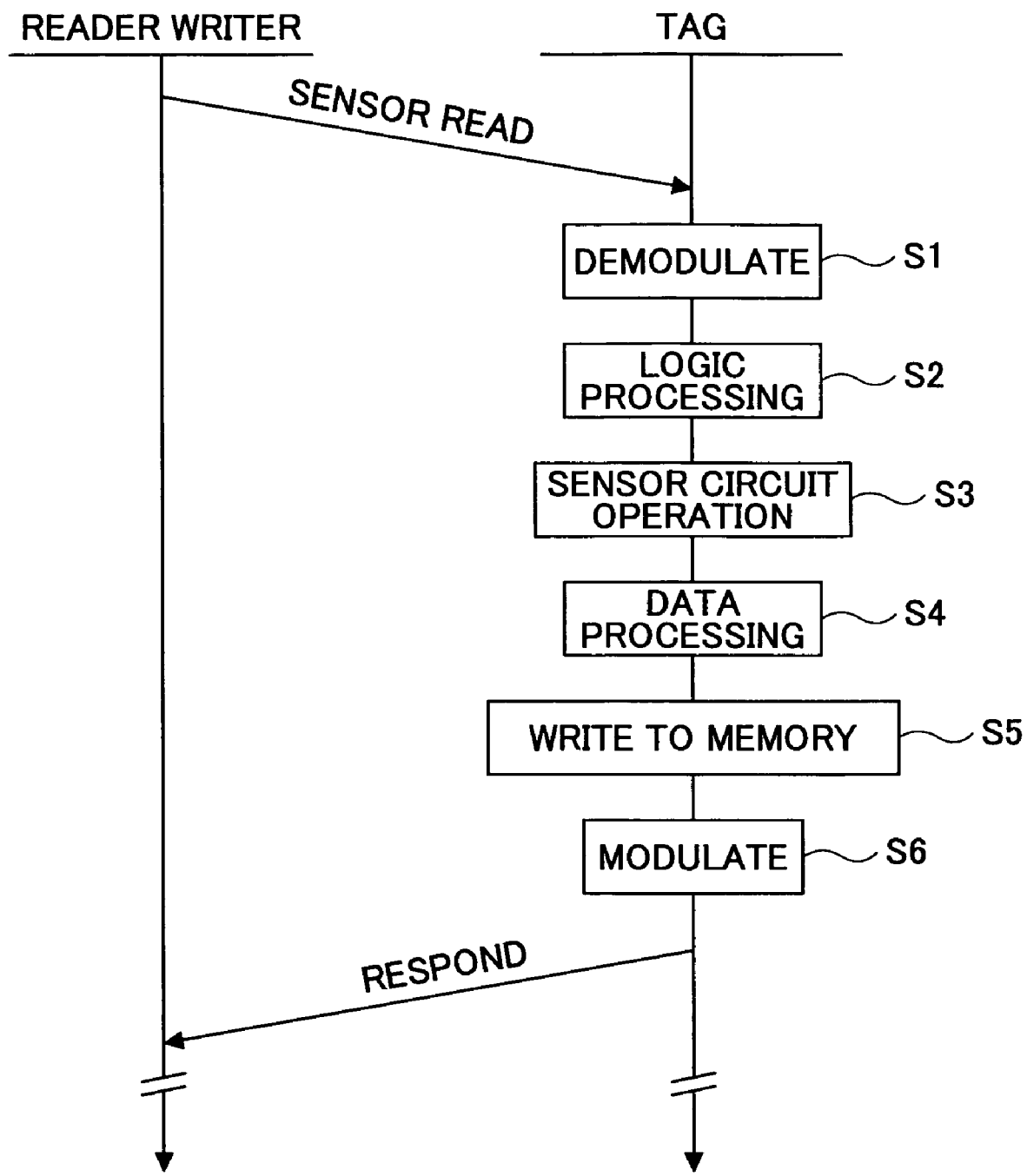
FIG. 4 is a flowchart showing a first embodiment of data collection by the RFID of the present invention.

FIG. 4 is a flowchart showing a first embodiment of data collection by the RFID of the present invention. With reference to FIG. 4, the first embodiment of data collection by the RFID will be described. This first embodiment is directed to an example in which the logic circuit 18 of the sensor-equipped RFID chip 200 performs control such that the data collecting operation of the sensor and the write operation of the nonvolatile memory are not performed concurrently.

The reader writer 300 supplies a sensor read command to the tag (the sensor-equipped RFID chip 200 and the antenna coil 100). The data demodulation circuit 24 demodulates the sensor read command (S1). The data processing circuit 43 of the logic circuit 18 performs logic processing on the demodulated data (S2). The results of the logic processing of the sensor read command by the data processing circuit 43 (i.e., decoded results) are supplied to the control circuit 41. In response to the decoded results, the control circuit 41 controls the relevant parts to perform a sensor read operation.

The sensor circuit 16 is activated first to perform a data collecting operation by the sensor circuit 16 (S3). The measurement data collected by the sensor circuit 16 is supplied to the data processing circuit 43 via the sensor IF circuit 45 of the logic circuit 18. The measurement data is converted into measurement data in predetermined format by predetermined data processing, and is temporarily stored in the data processing circuit 43 (S4).

Upon the completion of data collecting operation by the sensor circuit 16, the measurement data is written to the nonvolatile memory 14 (S5) after the halt of the operation of the sensor circuit 16. Specifically, the measurement data temporarily stored in the data processing circuit 43 is transferred to the nonvolatile memory 14 via the memory IF circuit 44, and, also, the logic circuit 18 supplies a memory write command to the nonvolatile memory 14. This causes the measurement data to be written to the nonvolatile memory 14.

Thereafter, the measurement data temporarily stored in the data processing circuit 43 is supplied to the data modulation circuit 26 via the input/output circuit 42, and is modulated by the data modulation circuit 26 (S6). The modulated measurement data is transmitted from the antenna coil 100 to the reader writer 300.

In the data collecting operation as described above, the logic circuit 18 serves to receive and detect a data measurement command, and operates by use of an electric power supplied from the smoothing capacitor C2. The logic circuit 18 is designed to operate at a lower voltage than the operating voltage of the sensor circuit 16 and the nonvolatile memory 14 which operate by use of an electric power supplied from the smoothing capacitor C3. The power-supply control circuit 30 includes a digital volute serving as a dummy load and a series regulator for controlling the voltage in response to a change in the load. Based on the function of the digital volume and series regulator, the power-supply control circuit 30 serves to supply a constant direct-current voltage to the load.

The logic circuit 18 starts operating prior to the start of the operation of the sensor circuit 16, and is driven by the electric power of the smoothing capacitor C2 that is controlled by the power-supply control circuit 30 to be maintained at a predetermined voltage. The power-supply control circuit 30 provides to the smoothing capacitor C3 a predetermined voltage higher than the operating voltage of the logic circuit 18 to drive the sensor circuit 16. When the logic circuit 18 issues a sensor operation (data collection) start request, the sensor circuit 16 operates by use of the electric power of the smoothing capacitor C3 that is controlled by the power-supply control circuit 30 to be maintained at the predetermined voltage, thereby collecting data. When the logic circuit 18 issues a data write command thereafter, the nonvolatile memory 14 operates by use of the electric power of the smoothing capacitor C3 that is controlled by the power-supply control circuit 30 to be maintained at the predetermined voltage, thereby storing the data supplied from the logic circuit 18.

In a RFID chip provided with no sensor circuit 16, generally, the consumption of an electric power required to write data to the nonvolatile memory 14 is the largest. Accordingly, the amount of power consumption required to write data to the nonvolatile memory 14 becomes a control factor that determines the communication distance of the RFID chip. In consideration of this, the electric power required to drive the sensor circuit 16 may be set equal to or lower than the electric power required for the nonvolatile memory 14, and the operation may be controlled such that the operation of the sensor circuit 16 and the operation of the nonvolatile memory 14 do not overlap temporally. With such provision, it is possible to provide a sensor-equipped RFID chip, having an embedded sensor circuit 16, without degrading the performance relating to communication distance.

In the first embodiment described above, the logic circuit 18 of the sensor-equipped RFID chip 200 controls the sensing operation of the sensor circuit 16 and the store operation of the nonvolatile memory 14 such that these operations do not overlap temporally. Accordingly, a sensor function can be incorporated into a RFID chip without shortening communication distance, compared with the case in which no sensor circuit 16 is provided.

Figure 5:
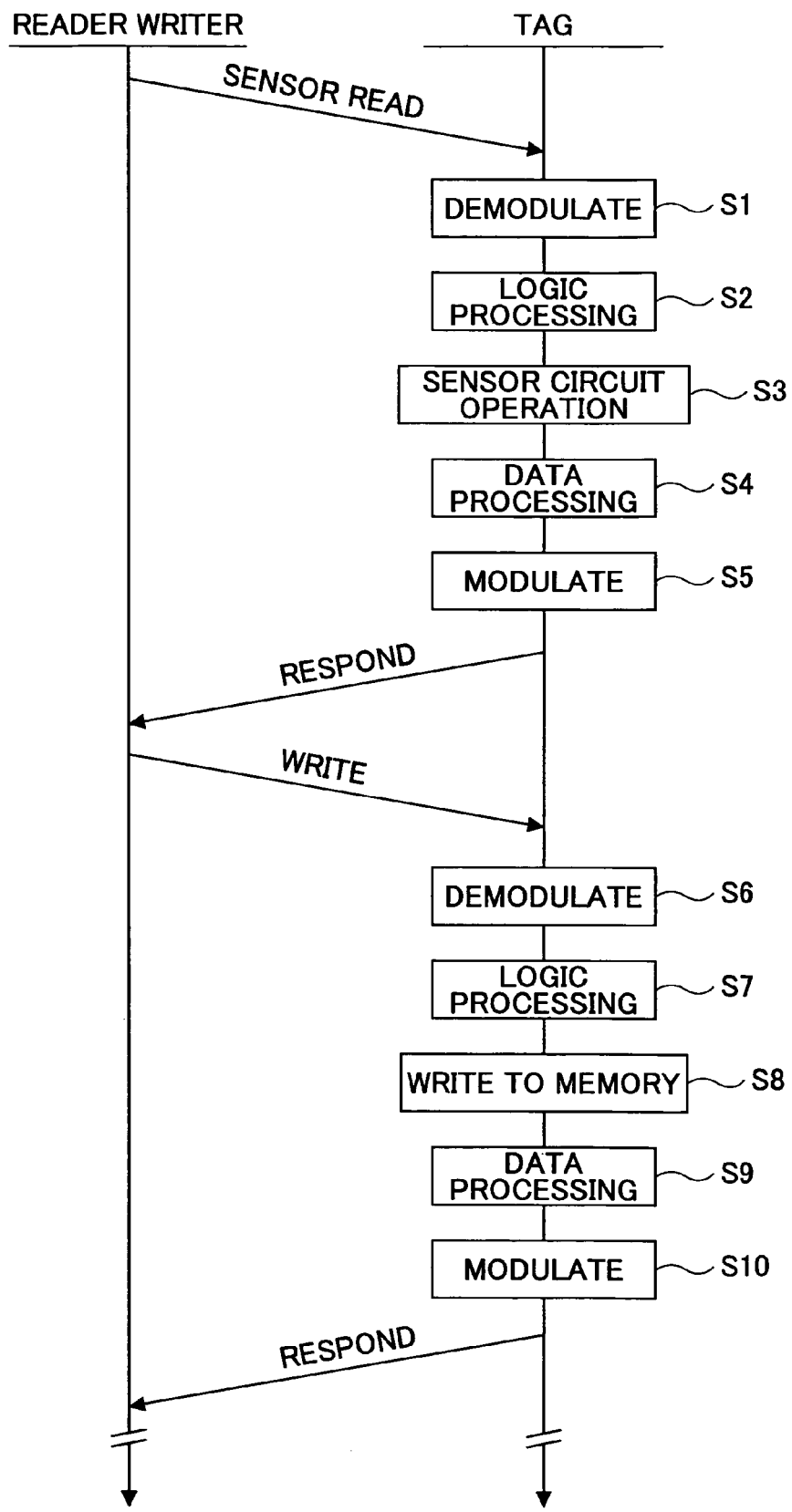
FIG. 5 is a flowchart showing a second embodiment of data collection by the RFID of the present invention.

FIG. 5 is a flowchart showing a second embodiment of data collection by the RFID of the present invention. With reference to FIG. 5, the second embodiment of data collection by the RFID will be described. This second embodiment is directed to an example in which the reader writer 300 performs control such that the data collecting operation of the sensor and the write operation of the nonvolatile memory are not performed concurrently.

The reader writer 300 supplies a sensor read command to the tag (the sensor-equipped RFID chip 200 and the antenna coil 100). The data demodulation circuit 24 demodulates the sensor read command (S1). The data processing circuit 43 of the logic circuit 18 performs logic processing on the demodulated data (S2). The results of the logic processing of the sensor read command by the data processing circuit 43 (i.e., decoded results) are supplied to the control circuit 41. In response to the decoded results, the control circuit 41 controls the relevant parts to perform a sensor read operation.

The sensor circuit 16 is activated first to perform a data collecting operation by the sensor circuit 16 (S3). The measurement data collected by the sensor circuit 16 is supplied to the data processing circuit 43 via the sensor IF circuit 45 of the logic circuit 18. The measurement data is converted into measurement data in predetermined format by predetermined data processing, and is temporarily stored in the data processing circuit 43 (S4).

The measurement data temporarily stored in the data processing circuit 43 is then supplied to the data modulation circuit 26 via the input/output circuit 42, and is modulated by the data modulation circuit 26 (S5). The modulated measurement data is transmitted from the antenna coil 100 to the reader writer 300.

After receiving the measurement data from the sensor-equipped RFID chip 200, the reader writer 300 transmits a write command to the sensor-equipped RFID chip 200. The data demodulation circuit 24 demodulates the write command (S6). The data processing circuit 43 of the logic circuit 18 performs logic processing on the demodulated data (S7). The results of the logic processing of the write command by the data processing circuit 43 (i.e., decoded results) are supplied to the control circuit 41. In response to the decoded results, the control circuit 41 controls the relevant parts to perform a write operation.

In the write operation, the measurement data is written to the nonvolatile memory 14 (S8). Specifically, the measurement data temporarily stored in the data processing circuit 43 by the sensor read operation as described above is transferred to the nonvolatile memory 14 via the memory IF circuit 44, and, also, the logic circuit 18 supplies a memory write command to the nonvolatile memory 14. This causes the measurement data to be written to the nonvolatile memory 14. Alternatively, the measurement data received by the reader writer 300 through the sensor read operation as described above may be transferred to the sensor-equipped RFID chip 200 together with the write command, and this transferred data may be written to the nonvolatile memory 14.

Thereafter, the measurement data temporarily stored in the data processing circuit 43 is subjected to predetermined data processing according to need (S9), is supplied to the data modulation circuit 26 via the input/output circuit 42, and is modulated by the data modulation circuit 26 (S10). The modulated measurement data is transmitted from the antenna coil 100 to the reader writer 300.

In the data collecting operation and memory write operation as described above, the electric power required to drive the sensor circuit 16 is preferably set equal to or lower than the electric power required for the nonvolatile memory 14. In the second embodiment, the reader writer 300 controls the sensing operation of the sensor circuit 16 and the store operation (write operation) of the nonvolatile memory 14 such that these operations do not overlap temporally. Accordingly, a sensor function can be incorporated into a RFID chip without shortening communication distance, compared with the case in which no sensor circuit 16 is provided.

Further, the present invention is not limited to these embodiments, but various variations and modifications may be made without departing from the scope of the present invention.

What is claimed is:

1. An integrated circuit chip, comprising:
a rectifier circuit configured to convert an alternating voltage supplied from an antenna into a first direct-current voltage;
a nonvolatile memory coupled to said rectifier circuit to operate by use of the first direct current voltage;
a sensor circuit coupled to said rectifier circuit to operate by use of the first direct-current voltage to collect measurement data;
a logic circuit configured to control said nonvolatile memory and said sensor circuit such that a write access operation of said nonvolatile memory and a data collecting operation of said sensor circuit are not performed concurrently; and
a data modulation circuit configured to modulate the measurement data,
wherein the write access operation of said nonvolatile memory is performed before the modulated measurement data is output via the antenna,
wherein the write access operates by use of a second direct-current voltage, and the second direct-current voltage is lower than the first direct-current voltage.

2. The integrated circuit chip as claimed in claim 1, wherein said logic circuit is configured to cause said sensor circuit to perform the data collecting operation in response to a predetermined command received via the antenna, and is configured to perform the write access operation to write measurement data obtained by the data collecting operation to said nonvolatile memory after the completion of the data collecting operation.

3. The integrated circuit chip as claimed in claim 2, wherein the measurement data stored in the register is transmitted to the data modulation circuit via the input/output circuit said logic circuit includes a register that temporarily stores the measurement data obtained by the data collecting operation.

4. The integrated circuit chip as claimed in claim 1, wherein an electric power consumed by said sensor circuit performing the data collecting operation is smaller than an electric power consumed by said nonvolatile memory performing the write access operation.

5. An RFID system, comprising:
a reader writer configured to transmit/receive a radio wave; and an IC tag configured to communicate with said reader writer through the radio wave,
wherein said IC tag includes:
an antenna;
a rectifier circuit coupled to said antenna to convert an alternating voltage of the radio wave received by said antenna into a first direct-current voltage;
a nonvolatile memory coupled to said rectifier circuit to operate by use of the first direct-current voltage;
a sensor circuit coupled to said rectifier circuit to operate by use of the first direct-current voltage to collect measurement data;
a logic circuit configured to control said nonvolatile memory and said sensor circuit such that write access operation of said nonvolatile memory and a data collecting operation of said sensor circuit are not performed concurrently; and
a data modulation circuit configured to modulate the measurement data,
wherein control is performed such that an write access operation of said nonvolatile memory and a data collecting operation of said sensor circuit are not performed concurrently,
wherein the write access operation of said nonvolatile memory is performed before the modulated measurement data is output via the antenna,
wherein the logic circuit operates by use of a second direct-current voltage, and the second direct-current voltage is lower than the first direct-current voltage.

6. The RFID system as claimed in claim 5, wherein said reader writer is configured to transmit a first predetermined command to said IC tag to cause said sensor circuit to perform the data collecting operation, and is configured to transmit a second predetermined command to said IC tag to cause the write access operation for writing measurement data obtained by the data collecting operation to said nonvolatile memory to be performed after the completion of the data collecting operation.

7. An IC tag for transmitting/receiving a radio wave to/from a reader writer, comprising:
an antenna;
a rectifier circuit coupled to said antenna to convert an alternating voltage of the radio wave received by said antenna into a first direct-current voltage;
a nonvolatile memory coupled to said rectifier circuit to operate by use of the first direct-current voltage;
a sensor circuit coupled to said rectifier circuit to operate by use of the first direct-current voltage to collect measurement data;
a logic circuit configured to control said nonvolatile memory and said sensor circuit by use of a second direct-current voltage such that a write access operation of said nonvolatile memory and a data collecting operation of said sensor circuit are not performed concurrently,
wherein the second direct-current voltage is lower than the first direct-current voltage; and
a data modulation circuit configured to modulate the measurement data,
wherein control is performed such that a write access operation of said nonvolatile memory and a data collecting operation of said sensor circuit are not performed concurrently,
wherein the write access operation of said nonvolatile memory is performed before the modulated measurement data is output via the antenna.

8. The IC tag as claimed in claim 7, further comprising a register that temporarily stores the measurement data obtained by the data collecting operation.

9. The RFID system as claimed in claim 5, wherein an electric power consumed by said sensor circuit performing the data collecting operation is smaller than an electric power consumed by said nonvolatile memory performing the access operation.

10. The integrated circuit chip as claimed in claim 1, further comprising:
a data demodulation circuit configured to demodulate a command signal supplied from the antenna; and
a control circuit configured to perform a write operation according to the demodulated command signal.

11. The integrated circuit chip as claimed in claim 1, wherein the logic circuit includes:

a input/output circuit configured to receive first data from the antenna;

a memory interface circuit configured to receive second data from the nonvolatile memory;

a sensor interface circuit configured to receive the measurement data from the sensor circuit; and a register configured to store the first data, the second data and the measurement data temporarily.

12. The RFID system as claimed in claim 5, wherein the logic circuit includes:

a input/output circuit configured to receive first data from the antenna;

a memory interface circuit configured to receive second data from the nonvolatile memory;

a sensor interface circuit configured to receive the measurement data from the sensor circuit; and a register configured to store the first data, the second data and the measurement data temporarily.

13. The IC tag as claimed in claim 7, wherein the logic circuit includes:

a input/output circuit configured to receive first data from the antenna;

a memory interface circuit configured to receive second data from the nonvolatile memory;

a sensor interface circuit configured to receive the measurement data from the sensor circuit; and a register configured to store the first data, the second data and the measurement data temporarily.

* * * * *

UNITED STATES PATENT AND TRADEMARK OFFICE
CERTIFICATE OF CORRECTION

PATENT NO. : 7,688,182 B2
APPLICATION NO. : 11/360601
DATED : March 30, 2010
INVENTOR(S) : Eiichi Nagai It is certified that error appears in the above-identified patent and that said Letters Patent is hereby corrected as shown below:

Title Page

Item (73), Assignee, please delete "Fujitsu Microelectronics Limited" and substitute therefor -- Fujitsu Microelectronics Limited, Tokyo (JP) --.

Signed and Sealed this

Twenty-eighth Day of September, 2010

David J. Kappos
*Director of the United States Patent and Trademark Office*